United States Patent
Drautz

(10) Patent No.: US 7,866,890 B2
(45) Date of Patent: Jan. 11, 2011

(54) SPINDLE MOTOR HAVING A FLUID DYNAMIC BEARING SYSTEM

(75) Inventor: Frank Drautz, Weissach im Tal (DE)

(73) Assignee: Minebea Co., Ltd., Nagano-ken (JP)

( * ) Notice: Subject to any disclaimer, the term of this patent is extended or adjusted under 35 U.S.C. 154(b) by 583 days.

(21) Appl. No.: 11/985,506

(22) Filed: Nov. 15, 2007

(65) Prior Publication Data

US 2008/0124012 A1 May 29, 2008

(30) Foreign Application Priority Data

Nov. 17, 2006 (DE) .................. 10 2006 054 626

(51) Int. Cl.
*F16C 32/06* (2006.01)

(52) U.S. Cl. ..................... 384/107; 384/100

(58) Field of Classification Search .............. 384/100, 384/107, 113
See application file for complete search history.

(56) References Cited

U.S. PATENT DOCUMENTS

| | | | |
|---|---|---|---|
| 4,254,961 A * | 3/1981 | Fersht et al. ................ | 384/100 |
| 6,118,620 A * | 9/2000 | Grantz et al. ............... | 384/107 |
| 6,900,567 B2 | 5/2005 | Aiello et al. | |
| 2002/0114547 A1 | 8/2002 | Nottingham | |
| 2006/0273673 A1* | 12/2006 | Yamamura et al. .......... | 384/107 |

FOREIGN PATENT DOCUMENTS

| | | |
|---|---|---|
| JP | 11299171 | 10/1999 |
| JP | 2000354349 | 12/2000 |

* cited by examiner

*Primary Examiner*—Thomas R Hannon
(74) *Attorney, Agent, or Firm*—Cooper & Dunham LLP

(57) ABSTRACT

The invention relates to a spindle motor having a fluid dynamic bearing system that comprises a base (10), a stationary shaft (14) connected to the base, a hub (16) rotatably supported with respect to the shaft and two bearing plates (24, 44) that are disposed at a mutual spacing about the shaft and connected to the hub. A bushing (22) is provided that is disposed between the bearing plates and separated from them by a gap (30, 50) at least partly filled with a bearing fluid. There are two stopper plates (26, 46) that are fixedly connected to the shaft, each abutting one side of each bearing plate and separated from the bearing plate by a bearing gap (28, 48) filled with bearing fluid. This results in two independent fluid dynamic bearing systems, each of which is disposed about a bearing plate. The motor is driven by an electromagnetic drive system.

13 Claims, 3 Drawing Sheets

SPINDLE MOTOR HAVING A FLUID DYNAMIC BEARING SYSTEM

BACKGROUND OF THE INVENTION

The invention relates to a spindle motor having a fluid dynamic bearing system, used in particular for hard disk drives.

PRIOR ART

Spindle motors having fluid dynamic bearing systems can be divided into two different groups: motors having a rotating shaft and a bearing system that is usually open at only one end (e.g. a single plate design) and motors having a stationary shaft. A distinct advantage afforded by the second group is the possibility of connecting the stationary shaft of the spindle motor to the housing not only at one end alone but also of fixing it at the other end to the top cover of the housing. Hence, these types of motors acquire considerably greater structural stiffness, making them particularly suitable for hard disk drives having special requirements, such as a large number of storage disks and a high number of revolutions for servers or for notebooks that are subject to more frequent or stronger vibrations during normal operation.

To date, the only type of spindle motor having a stationary shaft fixed at both ends that is in widespread use has a so-called "conical design" and is characterized by two conical parts (cones) that are pressed onto a stationary shaft. The rotor commonly consists of two bearing bushes separated axially from one another by an elastomer, the bearing bushes being correspondingly inversely tapered at their inside diameter and pressed into a hub at their outside diameter. A bearing gap is formed between the cones and the tapered regions of the bearing bushes forming an angle of approximately 30° to the rotational axis. To ensure the necessary form tolerances in the sub-micrometer range for this bearing gap, the outer surfaces of the stationary conical parts have to be specially rounded or raised by a few micrometers in order to compensate the inevitable deformations caused when they are pressed onto the shaft. For the same reason, the bushes that are pressed into the hub have to be once more machined at their tapered functional bearing surfaces after assembly of the rotor. Furthermore, hardening the cones to increase their resistance to wearing is usually impossible. Instead, they have to be specially coated (DLC diamond-like carbon coating) and then drilled through at a slant, making it possible to compensate any tolerances using a recirculation flow in the bearing. A final complex process worth mentioning involves adjusting the axial play, which for every single motor requires individual measurement of the distances between the intricately shaped parts and re-pressing to measure.

SUMMARY OF THE INVENTION

The object of the invention is to provide a new type of spindle motor that has the advantages of a motor fixed at both ends without the disadvantages of the complex, delicate and costly production processes involved for related motors according to the present prior art.

This object has been achieved according to the invention by the characteristics outlined in independent claim 1.

Preferred embodiments and further advantageous characteristics of the invention are revealed in the subordinate claims.

The motor design according to the invention, whose core elements are two simple bearing plates that are enclosed by separate fluid dynamic bearing systems, provides reliable, low-cost manufacture thanks to the simple shapes of the components used and its less complex assembly, and it has high structural stiffness thanks to the shaft being fixed at both ends.

According to the invention, a bushing made, for example, of aluminum, steel, bronze or plastics, is mounted onto a stationary shaft made, for example, of hardened steel by means of pressing or bonding. Compared to the other parts, the required manufacturing precision of this bushing plays a relatively insignificant part in the functional capability of the motor. The two bearing plates adjoin this bushing in the direction of the respective ends of the shaft, the bearing plates being connected at their outside diameter to the single-piece hub of the motor by means, for example, of pressing, bonding or welding. The axial spacing of the bearing plates is preferably determined by appropriate seats provided in the hub. Finally, following on the bearing plates towards the outside of the motor are stopper plates, each fixedly connected to the stationary shaft by means, for example, of pressing, bonding or welding, which together restrict the axial play of the rotor within the desired range.

The two independent fluid dynamic bearing systems are located around the bearing plates, each bearing system consisting of a radial and an axial bearing, which, as mentioned above, are preferably separated spatially by the bushing and sealed towards the motor interior. For this purpose, a radial bearing is formed between the inside diameter of the respective bearing plate and the stationary shaft with the aid of a suitable groove pattern preferably formed on the inside diameter of the bearing plate, and an axial bearing is formed between the flat side of the bearing plates facing outwards and the corresponding, opposing flat side of the stopper plates, it being possible to form the groove patterns for the axial bearing either on the bearing plates or on the stopper plates.

To ensure reliable motor operation and to compensate for any manufacturing tolerances, the two bearing systems should preferably be continuously flushed with bearing fluid during operation. This can be achieved using one or more recirculation channels, made, for example, by simply drilling a vertical hole through the bearing plates, since there is a gap filled with fluid on each of the two flat sides of the bearing plates. The groove pattern of preferably the axial bearing could be made asymmetric so as to influence the speed and direction of the recirculation flow. The gap formed between the flat sides of the bearing plates facing towards the motor interior and the bushing does not have an actual bearing function, so that its gap width and thus dimensional tolerance, may be greater by a factor of approximately 10-50 compared, for example, to the region of the radial bearing.

An obvious advantage of the two separate, fully flushed bearing systems lies in the fact that no unfavorable manufacturing tolerance combinations for the two radial bearings can occur since they function independently of one another and any air that is found in the bearing fluid after filling, or that is secreted from the bearing fluid into the low pressure regions during operation, is quickly flushed to an opening in the respective bearing region.

Various sealing concepts can be used to prevent bearing fluid from leaking out of the bearing gap and to provide sufficient bearing fluid for the functional capability of the motor during its entire useful life. One possibility is to provide a tapered reservoir narrowing towards the motor interior between the stopper plates and the hub, called a taper seal, where an appropriate slant may be given either solely to the outside diameter of the stopper plates, or to the inside diameter of the hub or perhaps to both sides. Furthermore, the two bearing systems can each be sealed towards the motor interior by a narrow gap formed between the bushing and the hub, the gap being provided with appropriate pumping patterns. The well-known sealing concept of an active pumping seal finds application here accordingly.

Another possibility that is particularly suitable for embodiment variants having very thin stopper plates or increased shock requirements is to design the active pumping seal between the outside diameter of the stopper plates and the relevant inside diameter of the hub and to place the tapered reservoir region for each bearing system between the bushing and the hub, facing towards the motor interior. Here, an appropriate slant may be given either solely to the outside diameter of the bushing or to the inside diameter of the hub or perhaps to both sides.

In both cases, a pressure equalization opening may be provided for any air trapped by the bearing fluid within the motor interior using, for example, a radial bore through the hub or a channel through the shaft.

The simple design of the components ensures precise and reliable assembly of the rotor, since, using a relatively uncomplicated process, the hub can be machined in such a way that after the bearing plates have been mounted, the axial runout of the entire rotor is minimized and any external mechanical forces acting on the rotor are transferred positively to the stopper plates. The axial play and position of the rotor is determined by the installation of the stopper plates, which, due to the large, level contact surfaces, can be easily measured and monitored in the assembly process.

DESCRIPTION OF PREFERRED
EMBODIMENTS OF THE INVENTION

Figure 1:
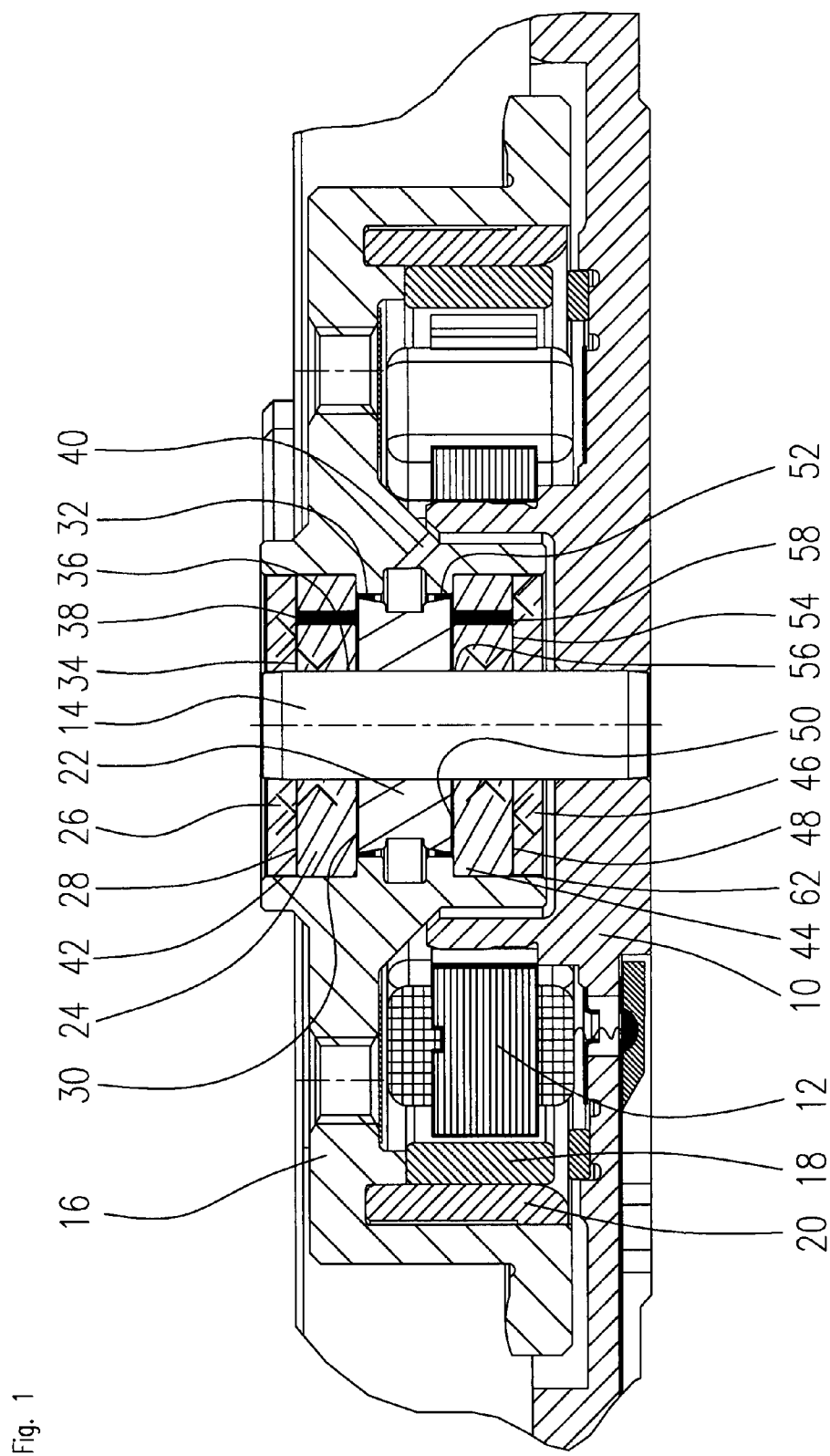
FIG. 1 shows a sectioned view of a first embodiment of the spindle motor according to the invention having a fluid dynamic seal.

FIG. 1 shows a section through a first embodiment of a spindle motor according to the invention having a fluid dynamic seal.

The spindle motor comprises a stationary base 10 on which a stator arrangement 12 is disposed in a conventional manner. A shaft 14 is fixedly accommodated in the base 10, the shaft being enclosed by a hub 16 that is rotatably supported with respect to the shaft 14. At its circumference, the hub 16 comprises a magnet arrangement 18 having an appropriate magnet yoke 20 that encloses the stator arrangement 12 and together with the stator arrangement forms an electromagnetic drive system.

The hub 16 is rotatably supported with respect to the shaft 14 by means of two independent fluid dynamic bearing systems that are disposed between the hub 16 and the shaft 14. A bushing 22 is disposed on the shaft 14 that separates the two fluid dynamic bearing systems from one another.

A first fluid dynamic bearing system is formed by a first bearing plate 24 that is disposed at the inside circumference of the hub 16 and spaced apart from the bushing 22 by a gap 30. This gap 30 continues as a bearing gap 28 between the shaft 14 and the bearing plate 24 and further between the bearing plate 24 and the stopper plate 26. The stopper plate 26 is fixedly connected to the end of the shaft 14. A first axial bearing 34 is provided between the opposing surfaces of the bearing plate 24 and of the stopper plate 26, the axial bearing being defined by appropriate bearing patterns formed on the surface of the bearing plate 24 and/or on the surface of the stopper plate. A first radial bearing 36 is formed between the inside diameter of the bearing plate 24 and the outside diameter of the shaft 14 using appropriate bearing patterns. Both the bearing gap 28 and the gap 30 are filled with bearing fluid, one end of the gap 30 running into a reservoir 32 that is formed between a circumferential surface of the bushing 22 and a corresponding opposing surface of the hub 16. This reservoir 32 acts as a fluid supply for the bearing fluid as well as a seal for the gaps 28, 30.

The bearing plate 24 can have a recirculation bore 38 that facilitates the exchange of fluid between the gap 30 and the bearing gap 28. To this effect, the axial or radial bearing patterns can be designed such that they exert an appropriate pumping action on the bearing fluid creating a circulation of fluid in the bearing gap 28 and the gap 30.

The lower bearing system is formed as a mirror image of the upper bearing system and comprises a second bearing plate 44 that, separated by a bearing gap 48, is located opposite a second stopper plate 46. The bearing plate 44 together with the stopper plate 46 form a second axial bearing 54, the bearing plate being fixedly connected to the hub 16 and the stopper plate 46 being fixedly connected to the shaft 14. A gap 50 again remains between the bushing 22 and the second bearing plate 44, the gap likewise being filled with bearing fluid and running into a reservoir 52 that acts as a fluid reservoir and a seal for the bearing gap 48 or the gap 50 respectively. A second radial bearing 56 is formed between the inside diameter of the second bearing plate 44 and the outside diameter of the shaft 14. The second bearing plate can likewise have at least one recirculation bore 58 that ensures the circulation of bearing fluid between the bearing gap 48 and the gap 50. The inner region between the bearing systems can be ventilated towards the outside via an opening 40.

The open ends of the bearing gaps 28, 48 in the region of the stopper plates 26, 46 can be sealed by a gap seal 42, 62 defined between the stopper plates and the hub. Here, active pumping seals can also be provided in a conventional manner, it being possible to form the pumping patterns on an inside diameter of the hub 16 and/or on the outside diameter of the stopper plate 26, 46.

Figure 2:
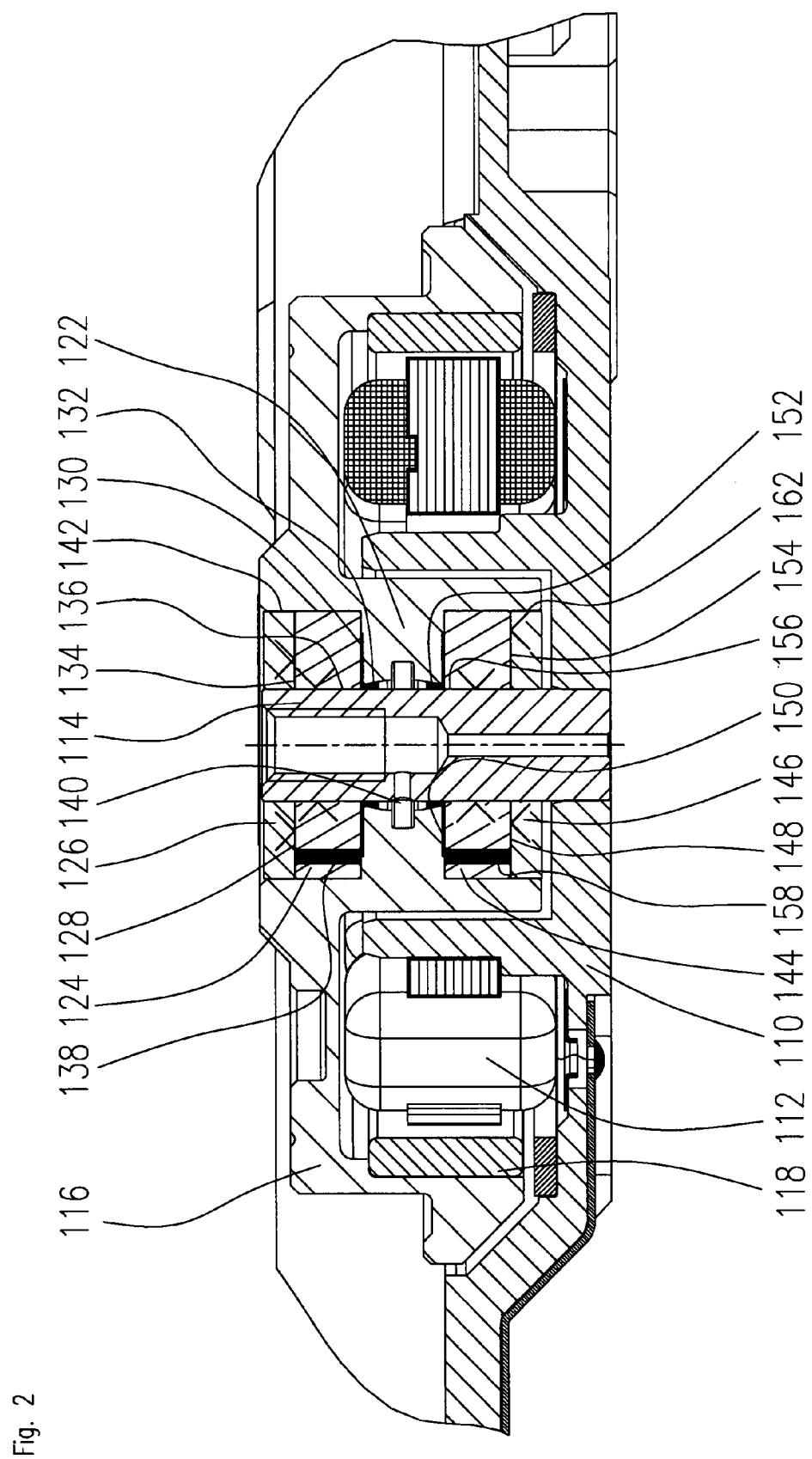
FIG. 2 shows a sectioned view of a second embodiment of the spindle motor according to the invention having a fluid dynamic seal.

FIG. 2 shows a section through a second embodiment of a spindle motor according to the invention having a fluid dynamic seal.

The spindle motor comprises a stationary base 110 on which a stator arrangement 112 is disposed in a conventional manner. A shaft 114 is fixedly accommodated in the base 110, the shaft being enclosed by a hub 116 that is rotatably supported with respect to the shaft 114. The hub 116 comprises a magnet arrangement 118 that encloses the stator arrangement 112 and together with the stator arrangement forms an electromagnetic drive system.

The hub 116 is rotatably supported with respect to the shaft 114 by means of two independent fluid dynamic bearing systems that are disposed between the hub 116 and the shaft 114. A collar 122 taking the form of a bushing is formed at an inner circumferential surface of the hub, the collar enclosing the shaft at a slight spacing and separating the two fluid dynamic bearing systems from one another. The collar 122 can, for example, be integrally formed as one piece with the hub.

A first fluid dynamic bearing system is formed by a first bearing plate 124 that is disposed at the inside circumference of the hub 116 and spaced apart from the bushing 122 by a gap 130. This gap 130 continues along the shaft around the bearing plate 124 and runs into a bearing gap 128 that separates the bearing plate 124 from the shaft 114 and a stopper plate 126 covering the bearing plate. The stopper plate 126 is fixedly connected to the end of the shaft 114. A first axial bearing 134 is provided between the opposing surfaces of the bearing plate 124 and of the stopper plate 126, the axial bearing being defined by appropriate bearing patterns formed on the surface of the bearing plate 124 and/or on the surface of the stopper plate 126. The inside diameter of the bearing plate 124 is likewise separated by the bearing gap 128 from the outside diameter of the shaft 114, a first radial bearing 136 characterized by appropriate bearing patterns being provided between these two surfaces. Both the bearing gap 128 and the gap 130 are filled with bearing fluid, the gap 130 running into a reservoir 132 that is formed between a circumferential surface of the shaft 114 and a corresponding opposing surface of the bushing 122. This reservoir 132 acts as a fluid supply for the bearing fluid as well as a seal for the bearing gaps 128 and 130.

The bearing plate 124 can have a recirculation bore 138 that facilitates the exchange of fluid between the gap 130 and the bearing gap 128. To this effect, the bearing patterns of the axial and radial bearing can be designed such that they exert an appropriate pumping action on the bearing fluid, creating a circulation of fluid in the bearing gap 128 or the gap 130 respectively. The interior of the bearing can be ventilated towards the outside via an opening 140.

The lower bearing system is formed as a mirror image of the upper bearing system and comprises a second bearing plate 144 that, separated by a bearing gap 148, is located opposite a second stopper plate 146. The bearing plate 144 together with the stopper plate 146 form a second axial bearing 154, the bearing plate being fixedly connected to the hub 116 and the stopper plate 146 being fixedly connected to the shaft 114. A gap 150 again remains between the bushing 122 and the second bearing plate 144, the gap likewise being filled with bearing fluid and running into a reservoir 152 that acts as a fluid reservoir and a seal for the bearing gap 148 or the gap 150 respectively. A second radial bearing 156 is formed between the inside diameter of the second bearing plate 144 and the outside diameter of the shaft 114. The second bearing plate 144 can have at least one recirculation bore 158 that ensures circulation of the bearing fluid between the bearing gap 148 and the gap 150.

The open ends of the bearing gaps 128, 148 in the region of the stopper plates 126, 146 can be sealed by a gap seal 142, 162 defined between the stopper plates and the hub. Here, an active pumping seal can also be provided in a conventional manner.

Figure 3:
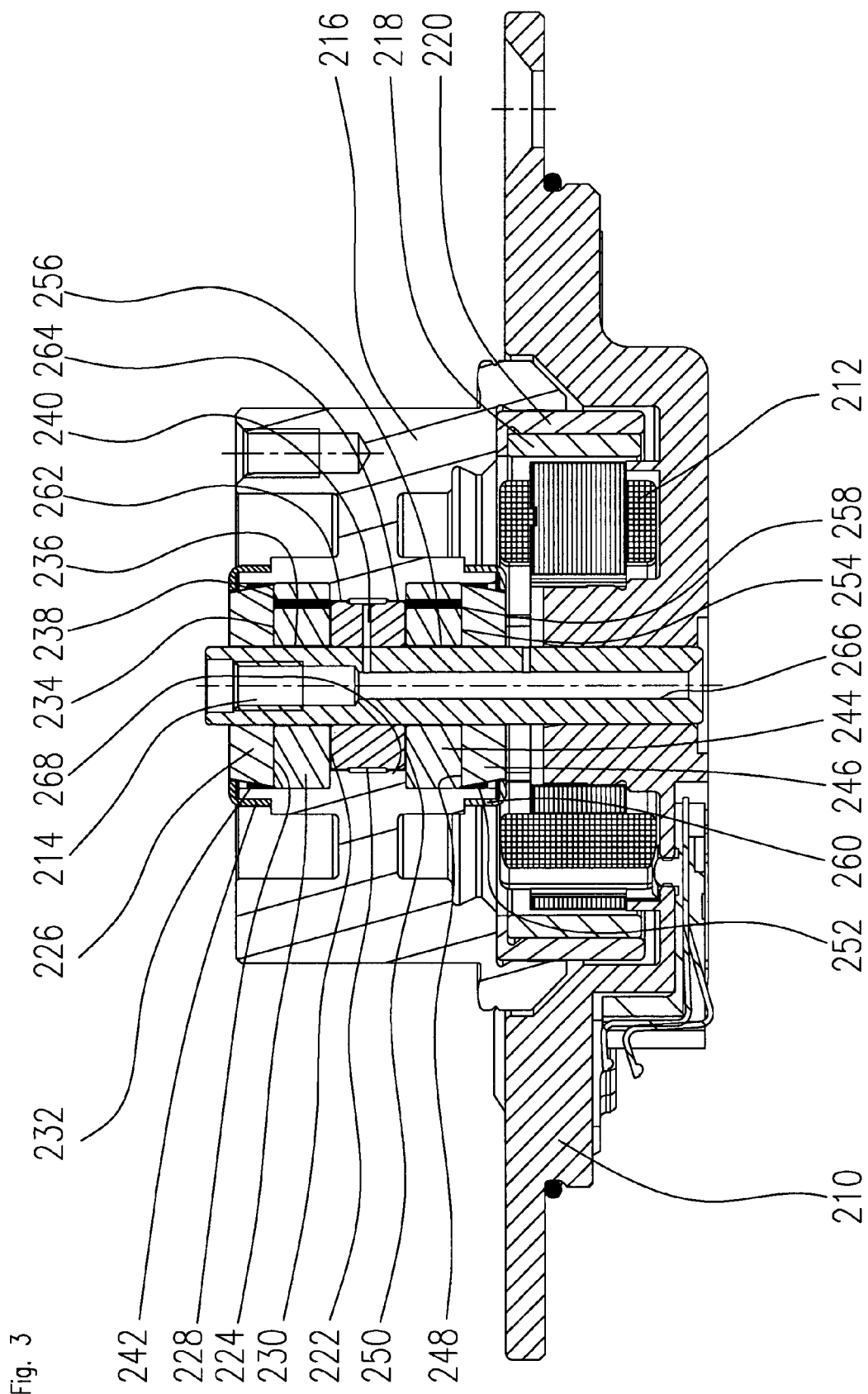
FIG. 3 shows a sectioned view of a third embodiment of the spindle motor according to the invention having a fluid dynamic seal.

FIG. 3 shows a section through a third embodiment of a spindle motor according to the invention having a fluid dynamic seal.

The spindle motor comprises a stationary base 210 on which a stator arrangement 212 is disposed in a conventional manner. A shaft 214 is fixedly accommodated in the base 210, the shaft being enclosed by a hub 216 that is rotatably supported with respect to the shaft 214. The hub 216 comprises a magnet arrangement 218 having an appropriate magnet yoke 220 that encloses the stator arrangement 212 and together with the stator arrangement forms an electromagnetic drive system.

The hub 216 is rotatably supported with respect to the shaft 214 by means of two independent fluid dynamic bearing systems that are disposed between the hub 216 and the shaft 214. A bushing 222 is disposed on the shaft 214 that separates the two fluid dynamic bearing systems from one another.

A first fluid dynamic bearing system is formed by a first bearing plate 224 that is disposed at the inside circumference of the hub 216 and spaced apart from the bushing 222 by a gap 230. This gap 230 continues along the shaft 214 around the bearing plate 224 until it reaches a bearing gap 228 that separates the bearing plate 224 from the shaft 214 and a stopper plate 226 covering the bearing plate. The stopper plate 226 is fixedly connected to the end of the shaft 214. A first axial bearing 234 is provided between the opposing surfaces of the bearing plate 224 and of the stopper plate 226, the axial bearing being defined by appropriate bearing patterns formed on the surface of the bearing plate 224 and/or on the surface of the stopper plate 226. The inside diameter of the bearing plate 224 is likewise separated by the bearing gap 228 from the outside diameter of the shaft 214, a first radial bearing 236 characterized by appropriate bearing patterns being provided between these two surfaces. Both the bearing gap 228 and the gap 230 are filled with bearing fluid, the gap 230 running into a reservoir 232 that is formed at the outside circumference of the stopper plate 226 between the stopper plate 226 and a corresponding opposing surface of the hub 216. This reservoir 232 acts as a fluid supply for the bearing fluid as well as a seal for the bearing gap 228. An improved seal can be achieved by using a cover 242 that is disposed on the hub 216 and covers the reservoir 232.

The bearing plate 224 can have a recirculation bore 238 that facilitates the exchange of fluid between the gap 230 and the bearing gap 228. To this effect, the bearing patterns of the axial and radial bearing can be designed such that they exert an appropriate pumping action on the bearing fluid, creating a circulation of fluid in the bearing gap 228 or the gap 230 respectively. The interior of the bearing can be ventilated towards the outside via an opening 240.

The lower bearing system is formed as a mirror image of the upper bearing system and comprises a second bearing plate 244 that, separated by a bearing gap 248, is located opposite a second stopper plate 246. The bearing plate together with the stopper plate 246 form a second axial bearing 254, the bearing plate being fixedly connected to the hub 216 and the stopper plate 246 being fixedly connected to the shaft 214. A gap 250 again remains between the bushing 222 and the second bearing plate 244 the gap being filled with bearing fluid. The bearing gap 248 runs into a reservoir 252 that acts as a fluid reservoir and a seal for the bearing gap 248 or the gap 250 respectively. The reservoir 252 runs between the outside circumference of the stopper plate 246 and a corresponding opposing surface of the hub 216. A second radial bearing 256 is formed between the inside diameter of the second bearing plate 244 and the outside diameter of the shaft 214. The second bearing plate 246 can have at least one recirculation bore 258 that ensures the circulation of bearing fluid between the bearing gap 248 and the gap 250.

The open ends of the bearing gaps 228, 248 in the region of the bushing 222 can be sealed by a gap seal 262, 264 defined between the bushing 222 and the hub 216. Here, an active pumping seal can also be provided in a conventional manner whose pumping patterns can be formed on the surface of an inside diameter of the hub 216 and/or of an outside diameter of the bushing 222.

The manufacture of the bearing parts and the assembly of the bearings illustrated in FIGS. 1 to 3 are described below using the bearing according to FIG. 3 as an example. Machining of the bearing parts and of the bearing surfaces is facilitated by the large central opening in the hub 216. The surfaces of the hub made accessible through the opening of the hub 216 can be processed in one operation. This means that the hub needs only be clamped once into a suitable chuck tool, and all the procedures necessary for the inside surfaces can then be carried out. The bearing plates 224, 244 as well as the stopper plates 226, 246 are preferably machined using a lathe, thus making it possible to achieve extremely high-precision bearing surfaces and high concentricity. The bearing surfaces can then be additionally ground. The recirculation bores 238, 258 are then drilled into the bearing plates.

The bearing can now be assembled. The bushing 222 that separates the upper and the lower bearing system from one another is first fixed onto the shaft 214 at a predetermined position. The shaft 214 is either made hollow or it has a central bore 266. The bushing 222 may, for example, be pressed onto the shaft or attached to it by means of bonding. It is also possible to use a heat shrink fit. After this operation, the opening 240 can then be drilled into the bushing 222, taking the form, for example, of a cross-hole running from the outside diameter of the bushing 222 into the bore 266 of the shaft and acting as a ventilation hole to ventilate the interior of the bearing.

In the next step, the assembly of shaft 214 and bushing 222 is positioned in the central opening of the hub 216. After this, the bearing plates 224 and 244 can be slid on from both ends of the shaft 214 and pressed into the corresponding recesses in the hub 216. The bearing plates 224 and 244 are accordingly fixedly connected to the hub 216 whereas the bushing 222 is fixedly connected to the shaft. Annual gaps 230 and 250 remain between the mutually facing surfaces of the bearing plates 224, 244 and of the bushing 222. The dimensions of the gaps are derived from the axial height of the collar 268 at the inside circumference of the hub 216 and the axial height of the bushing 222 that is disposed in this region of the hub 216.

In a following step, the stopper plates 226 and 246 can be pressed onto the shaft from both ends of the shaft 214. The width of the bearing gaps 228 and 248 in the region of the axial bearings 234 and 254 is defined by the axial position of the stopper plates 226, 246 with respect to the bearing plates 224 or 244 respectively. Finally, the gaps 228, 248, 230, 250 and the recirculation bores 238, 258 have to be filled with a bearing fluid, such as a bearing oil. Appropriate filling methods are known from the prior art.

IDENTIFICATION REFERENCE LIST

10 Base
12 Stator arrangement
14 Shaft
16 Hub
18 Magnet arrangement
20 Yoke
22 Bushing
24 Bearing plate (first)
26 Stopper plate (first)
28 Bearing gap (first)
30 Gap
32 Reservoir
34 Axial bearing
36 Radial bearing
38 Recirculation bore
40 Opening
42 Seal
44 Bearing plate (second)
46 Stopper plate (second)
48 Bearing gap (second)
50 Gap
52 Reservoir
54 Axial bearing
56 Radial bearing
58 Recirculation bore
62 Seal
110 Base
112 Stator arrangement
114 Shaft
116 Hub
118 Magnet arrangement
122 Bushing
124 Bearing plate (first)
126 Stopper plate (first)
128 Bearing gap (first)
130 Gap
132 Reservoir
134 Axial bearing
136 Radial bearing
138 Recirculation bore
140 Opening
142 Seal
144 Bearing plate (second)
146 Stopper plate (second)
148 Bearing gap (second)
150 Gap
152 Reservoir
154 Axial bearing
156 Radial bearing
158 Recirculation bore
162 Seal
210 Base
212 Stator arrangement
214 Shaft
216 Hub
218 Magnet arrangement
220 Yoke
222 Bushing
224 Bearing plate (first)
226 Stopper plate (first)
228 Bearing gap (first)
230 Gap
232 Reservoir
234 Axial bearing
236 Radial bearing
238 Recirculation bore
240 Opening
242 Cover
244 Bearing plate (second)
246 Stopper plate (second)
248 Bearing gap (second)
250 Gap
252 Reservoir
254 Axial bearing
256 Radial bearing
258 Recirculation bore
260 Cover
262 Seal
264 Seal
266 Bore (in shaft)
268 Collar (inside circumference of the hub)

The invention claimed is:

1. A spindle motor having a fluid dynamic bearing system comprising:
a base, a stationary shaft connected to the base, a hub rotatably supported with respect to the shaft, a first bearing plate and a second bearing plate that are disposed at a mutual spacing about the shaft and connected to the hub, a bushing that is disposed between the first bearing plate and the second bearing plate and separated from the first bearing plate by a first gap at least partly filled with bearing fluid and separated from the second bearing plate by a second gap at least partly filled with bearing fluid, a first stopper plate and a second stopper plate that are fixedly connected to the shaft, the first stopper plate abutting one side of the first bearing plate and separated from the first bearing plate by a first bearing gap filled with bearing fluid, the second stopper plate abutting one side of the second bearing plate and separated from the second bearing plate by a second bearing gap filled with bearing fluid, a first fluid dynamic bearing system which is disposed about the first bearing plate, a second fluid dynamic bearing system which is independent of the first fluid dynamic bearing system and which is disposed about the second bearing plate, and an electromagnetic drive system.

2. A spindle motor according to claim 1, characterized in that the bushing is fixedly connected to the shaft.

3. A spindle motor according to claim 1, characterized in that the bushing is fixedly connected to the hub.

4. A spindle motor according to claim 1, characterized in that each of the first fluid dynamic bearing system and the second fluid dynamic bearing system consists of a radial and an axial bearing, and is spatially separated and sealed towards the interior of the motor by said bushing disposed between the first bearing plate and the second bearing plate.

5. A spindle motor according to claim 1, characterized in that a first radial bearing is formed between the inside diameter of the first bearing plate and the shaft with the aid of an appropriate first bearing pattern and in that a second radial bearing is formed between the inside diameter of the second bearing plate and the shaft with the aid of an appropriate second bearing pattern.

6. A spindle motor according to claim 5, characterized in that the first bearing pattern and the second bearing pattern are formed as symmetric or asymmetric groove patterns.

7. A spindle motor according to claim 1, characterized in that a first axial bearing is formed between the opposing surfaces of the first bearing plate and the abutting first stopper plate with the aid of an appropriate first bearing pattern and in that a second axial bearing is formed between the opposing surfaces of the second bearing plate and the abutting second stopper plate with the aid of an appropriate second bearing pattern.

8. A spindle motor according to claim 7, characterized in that the first bearing pattern and the second bearing pattern are formed as symmetric or asymmetric groove patterns.

9. A spindle motor according to claim 1, characterized in that in the first bearing plate at least one recirculation channel is provided that connects the opposing end faces of the first bearing plate to each other and in that in the second bearing plate at least one recirculation channel is provided that connects the opposing end faces of the second bearing plate to each other.

10. A spindle motor according to claim 1, characterized in that a first reservoir having a conical cross-section is provided between the first stopper plate and the hub, the first reservoir being connected to the first bearing gap, and in that a second reservoir having a conical cross-section is provided between the second stopper plate and the hub, the second reservoir being connected to the second bearing gap.

11. A spindle motor according to claim 1, characterized in that the first bearing gap is sealed by an active pumping seal that is formed by a first narrow gap provided with suitable pumping patterns formed between the bushing and the hub and in that the second bearing gap is sealed by an active pumping seal that is formed by a second narrow gap provided with suitable pumping patterns formed between the bushing and the hub.

12. A spindle motor according to claim 1, characterized in that the first bearing gap is sealed by an active pumping seal that is formed by a first narrow gap provided with suitable pumping patterns formed between the outside diameter of the first stopper plate and the corresponding inside diameter of the hub and in that the second bearing gap is sealed by an active pumping seal that is formed by a second narrow gap provided with suitable pumping patterns formed between the outside diameter of the second stopper plate and the corresponding inside diameter of the hub.

13. A spindle motor according to claim 1, characterized in that a first tapered reservoir for the first fluid dynamic bearing system is disposed adjoining the first gap between the bushing and the hub in the region of the interior of the motor and in that a second tapered reservoir for the second fluid dynamic bearing system is disposed adjoining the second gap between the bushing and the hub in the region of the interior of the motor.

* * * * *